Nov. 6, 1934.  C. F. REIS  1,979,813
ROTOR FOR MAGNETOS
Filed Oct. 27, 1933
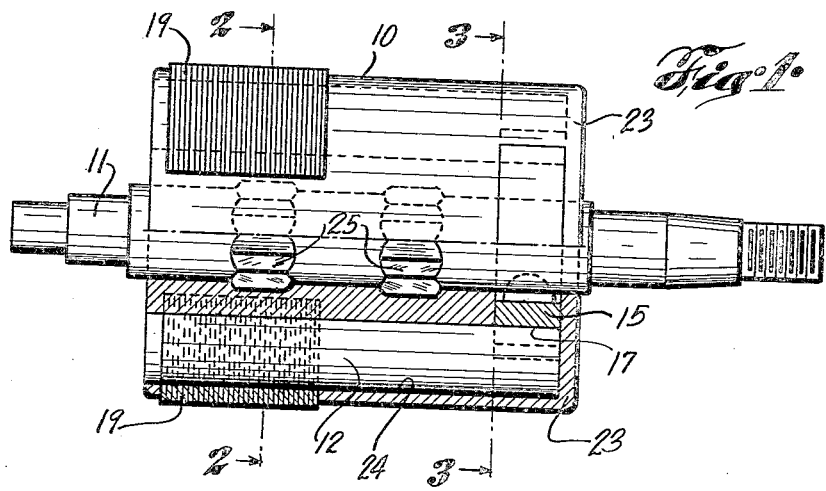
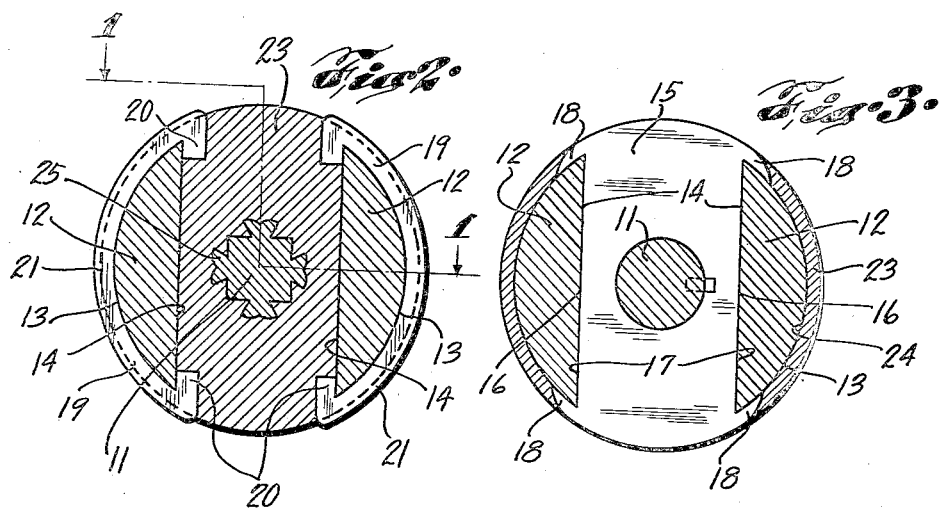
INVENTOR.
CURT F. REIS
BY
Roy M. Eilers
ATTORNEY.

Patented Nov. 6, 1934

1,979,813

UNITED STATES PATENT OFFICE 1,979,813

ROTOR FOR MAGNETOS

Curt F. Reis, Beloit, Wis., assignor to Fairbanks, Morse & Co., Chicago, Ill., a corporation of Illinois Application October 27, 1933, Serial No. 695,386

9 Claims. (Cl. 171—209)

This invention relates to improvements in rotors for magnetos, and more particularly to improvements in rotor constructions of magnetos of the type employing rotating, permanent magnets, being those machines of so-called rotating field type.

In certain prior types of magneto rotors, it is usual to employ a mass of cast non-magnetic metal, such as brass, for the rotor shaft, and for intimately uniting the laminated pole shoes. Such structures are objectionable, in that a cast shaft is comparatively low in tensile strength and rigidity, and is necessarily expensive for shafting material. In magnetos of this type it is desirable to employ permanent magnets formed of cobalt steel or other material having high magnetic retentivity. Such materials have not been widely used in magnetos, because of the difficulty experienced in machining, and in securing the pole pieces in assembly in the rotor. In prior types of rotor construction, it is usual to employ screws or other like fastening means for securing the permanent magnets and the various related parts, to the rotor shaft. Such constructions are objectionable in that the screws are very likely to become loose and ineffective after a period of use.

An object of the present invention is to provide an improved rotor for magnetos of the type noted, which includes a rotor shaft formed of steel or other similar material, and a mass of die-cast aluminum or zinc alloy for structurally uniting the laminated pole shoes to the shaft. By this provision, a shaft of substantial strength and rigidity is employed in the rotor assembly.

A further object is to provide an improved rotor construction for magnetos of the rotating field type, which includes a mass of die-cast, non-magnetic metal, for securing the laminated pole shoes to the rotor shaft, and pole pieces of bar stock material, secured in intimate contact to the pole-piece-bridging member, to provide a unitary structure.

An additional object is to provide an improved rotor for magnetos of the rotating field type, which is rigid and durable in construction, and is composed of but a few simple and easily machined parts, which are held securely on the rotor shaft, by a mass of die cast non-magnetic metal, thus effecting a substantial reduction in production cost, through minimization of assembly operations.

A still further object is attained in an improved arrangement and construction of pole-shoe laminations for rotors of rotating field magnetos which include pole pieces; each pole piece having an arcuate external portion merging into a plane internal face, each pole-shoe lamination forming a comparatively thin metallic separation between the external portion of the pole piece and the periphery of the rotor, and being provided with an inwardly projecting portion for grippingly engaging the plane portion of the pole for securing the lamination in position. By this provision the weight of the pole shoe lamination is reduced considerably, and a saving in material costs is effected.

Further objects and advantages will appear from the following detailed description of parts, and from the accompanying drawing, of a presently preferred embodiment, in which:

Fig. 1 is a longitudinal section of a preferred form of rotor for magnetos of the rotating field type, the section being taken along the line 1—1 of Fig. 2; Fig. 2 is a transverse section taken along line 2—2 of Fig. 1 and Fig. 3 is a transverse section taken along line 3—3 in Fig. 1.

Referring by reference characters to the drawing, the numeral 10 designates, generally, a preferred form of rotor for magnetos of the rotating field type, which includes a rotor shaft 11 formed, by preference, of mild steel or other similar shafting material of substantial strength and rigidity. A plurality of pole pieces or permanent magnets 12 are, by preference, arranged in spaced relation and substantially parallel to each other, and parallel to the shaft. The pole pieces are, by preference, formed of cobalt steel or other material possessing high magnetic retentivity. Each pole is, by preference, formed from a rolled steel bar having an arcuate external portion 13, the bar being cut to the desired length and then ground to form a plane portion 14. In the preferred example shown, the rotor includes two such pole pieces, although it will be understood that the number may be varied, depending upon the type and number of poles of the magneto to be constructed.

A bridging member 15 of soft iron or steel, is disposed near one end of the rotor and is provided at its opposite sides with recessed portions 16, each recess being characterized by an outer plane face portion 17 which is provided with hook-like pole gripping portions 18, projecting arcuately from each its ends, the pole piece disposed therein being grippingly or interlockingly held in the recess. The interior plane face 14 of the pole piece, is pressed into intimate magnetic contact with the adjacent plane portion 17 of the bridging member 15, while the ear or hook portions 18 grippingly engage the arcuate external margins of the pole piece. The bridging member forms a flux path between the pair of poles of opposite polarity, to provide a structure which is, in effect, a permanent magnet of U-shape or horseshoe type.

It will be apparent that, as above noted, the bridging members and pole shoe laminations are each provided with lateral recesses and hook-like terminal projections which are arranged to receive and engage the pole pieces in mortised relation to prevent angular and diametral displacement of the pole pieces with respect to the body of cast metal surrounding the pole pieces.

The bridging member may be secured to the rotor shaft 11 in any suitable manner, or may be spaced therefrom to interrupt the magnetic path through the shaft. Pole shoes 19 as provided, consist preferably of stacks of soft iron laminations, each of a generally arcuate shape, the laminations constituting each shoe being stacked in compression over an end portion of one of the pole pieces 12. Each lamination is provided with projecting pole piece gripping portions such as hook ends 20, for interlocking engagement with the plane face portion 14 of the pole piece, the portions 20 being connected by an unusually narrow band 21. It will be seen that the pole shoe only partially encircles, but nevertheless snugly embraces, the corresponding pole piece, by virtue of the shape and formation of the inwardly extending portions 20 of the individual laminations.

In assembling the rotor, the laminated pole shoes 19, rotor shaft 11, and bridging member 15, are suitably positioned in the relation of their final assembly, in a die-casting mold, with the laminations suitably kept in compressed relation, and while the parts are so positioned, a mass of non-magnetic metal 23, such as a suitable aluminum or zinc alloy, is then poured into the mold, intimately uniting in assembly with the shaft, the pole shoe laminations and bridging member. Before pouring, however, suitable cores are provided in the mold so that upon casting there results a pair of longitudinal openings 24, each corresponding in sectional shape to that of one of the pole pieces. Obviously, the pole pieces may be cast in place along with the shoes, member 15 and shaft; I prefer, however, to core the openings or passages 24 and, after casting, to press the magnets endwise into these passages, thus eliminating any thermal demagnetizing effects incident to casting the pole pieces in place.

My preference, according to the described method and practice of casting the rotor body to the shaft, is to provide the shaft, over spaced portions of its length, with externally angulate keying portions 25, which, after casting, serve to interlock the shaft and the body of cast metal 23, to preclude possibility of either endwise or angular, relative movement between the parts. The portions 25 are preferably characterized by acute angular recesses, so that it is impossible, due to any shrinkage effects, for the casting metal to pull away from the shaft.

The rotor is now completed, ready for use in a magneto, and it will be apparent that, by the above arrangement, that all screws or threaded fastening means for assembling the parts of the rotor, are eliminated, a much simpler and more secure assembly expedient being provided by the die-casting metal.

In the construction above described, it will be seen that the mass of cast, non-magnetic metal secures the various parts of the rotor to the shaft, and thus eliminates practically all of the former expensive and difficult machining operations on the hard steel magnet metal, the only operation advisable being that of grinding the plane face portions 14 of the pole pieces where they engage the member 15. This is simple and inexpensive, as compared to the machining necessary with prior types of rotors. It will be apparent that the present, improved rotor is neat and compact in construction, and forms practically a rigid, balanced, rotating mass. In the preferred example, a decided advantage over older prevailing types of magneto rotor constructions, is attained in the particular formation of the pole shoe laminations, which are characterized by the narrow arcuate band of metal for embracing the external arcuate margin of the pole piece, and the inwardly extended pole gripping portions. By these provisions a substantial reduction in material cost and weight of the pole shoe laminations, is effected.

It will, of course, be understood that the present detailed description of parts and the accompanying drawings relates to only a single preferred executional embodiment of the invention, and that substantial changes may be made in the described arrangement and construction of parts without departing from the spirit and full intended scope of the invention.

I claim as my invention:

1. In a field structure for a magneto, spaced pole pieces, a bridging member for the pole pieces, pole shoes carried by the pole pieces, and provided with an internal pole receiving seat, adapted to engage the associated pole pieces in mortised relation, and a body of metal disposed centrally of the field structure, and constituting a support for said pole pieces, shoes and bridging member.

2. In a rotor for a magneto of the rotating field type, a pair of spaced opposed permanent magnets, a body of cast non-magnetic metal between said magnets, a pole shoe for each of said magnets, the shoes being of laminated construction and of general arcuate form, terminal projections on the laminations of said shoe adapted marginally to grip the pole shoes, and extended inwardly of the rotor and into said body of cast metal.

3. In a rotor for a rotating field type of magneto, a pair of pole pieces disposed in opposed relation peripherally of the rotor, a body of cast metal disposed between the pole pieces, and pole shoes carried by the pole pieces, each of said shoes being constituted by laminations each of substantial "C" shape and having a portion turned inwardly of the rotor and embedded in said body of cast metal.

4. In a rotor for magnetos of the rotating field type, spaced pole pieces, a pole-piece-bridging member located diametrally of the rotor and having terminal projections adapted marginally to engage the pole pieces so as to receive the pole pieces therebetween, and coacting therewith to prevent angular and diametral displacement of the pole pieces with respect to the bridging member and other parts of the rotor.

5. In a field structure for a magneto, spaced pole pieces, a bridging member having lateral recesses adapted to receive and engage the pole pieces in mortised relation, pole shoes carried by the pole pieces, and a body of metal disposed centrally of the field structure, and constituting a support for said pole pieces, shoes and bridging member.

6. In a magneto rotor for a machine of the rotating field type, spaced pole pieces, a bridging member having lateral recesses adapted to receive the pole pieces, pole shoes carried by the pole pieces, and a body of cast non-magnetic metal disposed centrally of the rotor structure and constituting a support for said pole pieces, shoes and bridging member, the bridging member and shoes each being provided with projections adapted marginally to engage the pole pieces, and coacting to position the bridging member, pole pieces and pole shoes against displacement diametrally of the rotor.

7. In a rotor for a magneto of the rotating field type, a pair of spaced pole pieces, a pole piece bridging member disposed near one end of the pole pieces, pole shoes disposed near the opposite ends of the pole pieces, said bridging member and pole shoe each being characterized by paired opposed acute angulate projections, the paired projections adapted to receive one of the pole pieces therebetween, a shaft, and means for securing the pole pieces, bridging member and pole shoes in assembled relation to the shaft.

8. In a rotor for magnetos of the rotating field type, a pair of pole pieces each of substantially segmental cross section, a pole-piece-bridging member near one end of the pole pieces, a pole shoe carried by each of the pole pieces near its end opposite the bridging member, the pole shoes and bridging member being characterized by spaced paired hooklike terminal projections, the paired projections adapted marginally to grip the pole pieces, a shaft, and a body of die cast non-magnetic metal extending diametrally of the rotor and arranged to maintain the pole pieces, bridging member and pole shoes in assembled relation to the shaft, and means formed by the shaft for keyingly or interlockingly engaging the mass of die cast metal over a portion of the length of the shaft internally of the rotor.

9. In a rotor for an electric machine, of a type embodying a mass of cast metal poured about the rotor shaft, a plurality of metal-receiving seats, formed by the shaft, said seats being of a form to engage the poured metal in mortising relation.

CURT F. REIS.